(12) United States Patent
Alvarez et al.

(10) Patent No.: US 8,613,425 B2
(45) Date of Patent: Dec. 24, 2013

(54) VALVE SEAL MEMBER AND VALVE (75) Inventors: Raphael Alvarez, Geneva (CH); Pierre Sirdey, Geneva (CH)

(73) Assignee: Fluid Automation Systems S.A, Versoix (CH)

( * ) Notice: Subject to any disclaimer, the term of this patent is extended or adjusted under 35 U.S.C. 154(b) by 929 days.

(21) Appl. No.: 12/440,050

(22) PCT Filed: Sep. 26, 2006

(86) PCT No.: PCT/EP2006/009340
§ 371 (c)(1),
(2), (4) Date: Mar. 5, 2009

(87) PCT Pub. No.: WO2008/037272
PCT Pub. Date: Apr. 3, 2008

(65) Prior Publication Data
US 2009/0272928 A1    Nov. 5, 2009

(51) Int. Cl.
*F16K 31/00*    (2006.01)
*F16K 11/065*    (2006.01)
*F16K 11/044*    (2006.01)
*F16K 11/16*    (2006.01)

(52) U.S. Cl.
USPC .............. 251/335.1; 137/625.25; 137/625.48; 137/607

(58) Field of Classification Search
USPC ................ 137/625.25, 625.27, 625.48, 607; 251/335.1, 333
See application file for complete search history.

(56) References Cited

U.S. PATENT DOCUMENTS

| 3,329,165 | A | * | 7/1967 | Lang ......................... 137/625.5 |
| 3,464,446 | A |   | 9/1969 | Jaffier |
| 3,656,512 | A |   | 4/1972 | Countryman |
| 3,701,599 | A | * | 10/1972 | Stewart ..................... 137/625.48 |
| 3,731,905 | A | * | 5/1973 | Piet ................................ 251/333 |
| 4,070,005 | A | * | 1/1978 | McJones ........................ 251/333 |
| 6,450,198 | B1 |  | 9/2002 | Bouteille et al. |
| 6,488,050 | B1 | * | 12/2002 | Jabcon ..................... 137/625.65 |
| 6,523,833 | B1 |  | 2/2003 | Ishigaki et al. |
| 6,796,545 | B2 |  | 9/2004 | Enzaki et al. |

FOREIGN PATENT DOCUMENTS

| DE | 10335743 A1 | 2/2005 |
| EP | 0655573 A1 | 5/1995 |

* cited by examiner

*Primary Examiner* — Justin Jonaitis
(74) *Attorney, Agent, or Firm* — The Ollila Law Group LLC (57) ABSTRACT

The valve (100) comprises a valve body (101), a valve seat insert (103) assembled to the valve body (101), and a valve seal member (120) compressively assembled to and sealing to both the valve body (101) and the valve seat insert (103), with the valve seal member (120) including one or more port apertures (202).

7 Claims, 7 Drawing Sheets

VALVE SEAL MEMBER AND VALVE

BACKGROUND OF THE INVENTION

1. Field of the Invention

The present invention relates to a valve seal member and valve.

2. Statement of the Problem

A valve comprises a valve body containing a valve mechanism. Inlet and outlet ports communicate between the valve mechanism and the outside world. The body often comprises portions that are assembled to form a valve chamber including one or more valve seats and two or more passages, such as inlet and outlet ports. The valve mechanism can move in the valve body and can selectively contact and unblock the one or more valve seats in order to perform the valve function, thereby selecting and de-selecting ports.

Figure 1:
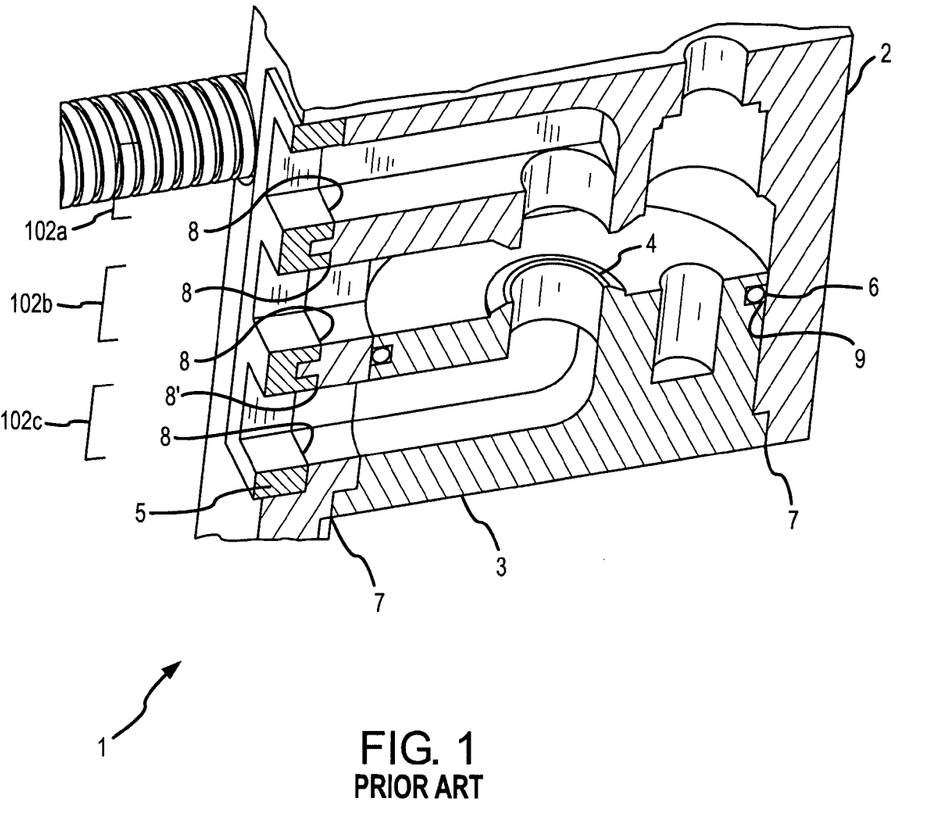
FIG. 1 shows a portion of a prior art valve.

FIG. 1 shows a portion of a prior art valve 1. The prior art valve 1 includes a valve body 2 and a valve seat insert 3. The prior art valve seat insert 3 can include a valve seat 4 that is contacted by a valve poppet or other valve mechanism. The valve seat insert 3 is assembled to a corresponding cavity of the prior art valve body 2 as part of forming the prior art valve 1. A prior art port insert 5 is further assembled to the valve body 2, with the prior art port insert 5 matching up with the valve body 2, as shown, to form two or more ports, such as the ports 102a-102c shown in the figure. The ports can comprise inlet ports, outlet ports, or both. The prior art port insert 5 contacts the prior art valve body 2 at multiple sealing regions 8. At the sealing region 8, the prior art port insert 5 seals to the valve body 2 by compression and deformation. The prior art port insert 5 is commonly a seal formed from an elastomeric material, such as rubber.

The prior art valve seat insert 3 can be sealed to the prior art valve body 2 by a weld region 7. The weld region 7 can be formed through ultrasonic welding, allowing the weld region 7 to be a distance from the outside of the valve.

The valve seat insert 3 further includes a ring seal 6 that seals an inner portion of the valve seat insert 3 to the valve body 2. The ring seal 6 is received in a channel 9 formed in the valve seat insert 3. The prior art ring seal 6 can comprise an O-ring or similar sealing device.

Consequently, the assembly of the prior art valve seat insert 3 into the prior art valve body 2 involves three separate sealing regions, adding complexity to the manufacturing process. The three separate regions are the ring seal 6, the weld region 7, and the sealing region 8. In addition, where port 102b is an inlet port, there may continuously be pressurized fluid in the port 102b. Therefore, there can be an increased likelihood of seal failure at one or both of a sealing region 8' and the ring seal 6.

SUMMARY OF THE INVENTION

A valve is provided according to the invention. The valve comprises a valve body, a valve seat insert assembled to the valve body, and a valve seal member compressively assembled to and sealing to both the valve body and the valve seat insert. The valve seal member includes one or more port apertures.

A valve seal member is provided according to the invention. The valve seal member comprises a port interface portion including one or more port apertures and a seal portion including an upper seal portion adapted to encompass an upper valve seat and a lower seal portion adapted to encompass a lower valve seat. The valve seal member further comprises a duct connecting a port aperture of the one or more port apertures to the seal portion.

A valve seal member is provided according to the invention. The valve seal member comprises a port interface portion including one or more port apertures and a seal portion including an upper seal portion adapted to encompass an upper valve seat and a lower seal portion adapted to encompass a lower valve seat. The valve seal member further comprises a lip formed on the upper seal portion, a lip formed on the lower seal portion, and a duct connecting a port aperture of the one or more port apertures to the seal portion. The valve seal member further comprises a retainer comprising an upper ring adapted to retain the upper seal portion to an upper valve interior surface, with the upper ring including a step that receives the lip of the upper seal portion, and a lower ring adapted to retain the lower seal portion to a lower valve interior surface, with the lower ring including a step that receives the lip of the lower seal portion.

A valve is provided according to an embodiment of the invention. The valve comprises a valve body including an upper valve seat and an upper seal channel and a valve seat insert assembled to the valve body. The valve seat insert includes a lower valve seat and a lower seal channel. The valve further comprises a valve seal member assembled to and sealing to the valve body and the valve seat insert. The valve seal member comprises a port interface portion including one or more port apertures, a seal portion including an upper seal portion that encompasses the upper valve seat and fits to the upper seal channel and a lower seal portion that encompasses the lower valve seat and fits to the lower seal channel, and a duct connecting a port aperture of the one or more port apertures to the seal portion.

Aspects of the Invention

In one embodiment of the valve, the valve seal member is formed of an at least partially flexible material.

In another embodiment of the valve, the valve seal member is formed of an at least partially elastic material.

In yet another embodiment of the valve, the valve seal member further comprises one or more tongue projections that are configured to fit to one or more corresponding depressions in the vale seat insert.

In one embodiment of the valve seal member, the valve seal member is formed of an at least partially flexible material.

In another embodiment of the valve seal member, the valve seal member is formed of an at least partially elastic material.

In yet another embodiment of the valve seal member, the valve seal member further comprises one or more tongue projections that are configured to fit to one or more corresponding depressions in the vale seat insert.

In yet another embodiment of the valve seal member, the upper seal portion includes a deformable portion and the lower seal portion includes a deformable portion.

In yet another embodiment of the valve seal member, the valve seal member further comprises a valve poppet positioned between the upper seal portion and the lower seal portion.

In yet another embodiment of the valve seal member, the valve seal member further comprises a valve poppet positioned between the upper seal portion and the lower seal portion, with the valve poppet including an actuator member receptacle that is adapted to receive at least a portion of a valve actuator member.

In yet another embodiment of the valve seal member, the valve seal member further comprises a lip formed on the upper seal portion, a lip formed on the lower seal portion, and a retainer comprising an upper ring adapted to retain the upper seal portion to an upper valve interior surface, with the upper ring including a step that receives the lip of the upper seal portion, a lower ring adapted to retain the lower seal portion to a lower valve interior surface, with the lower ring including a step that receives the lip of the lower seal portion, and one or more joiners extending between the upper ring and the lower ring.

In one embodiment of the valve, the valve seal member is formed of an at least partially flexible material.

In another embodiment of the valve, the valve seal member is formed of an at least partially elastic material.

In yet another embodiment of the valve, the upper seal portion includes a deformable portion and the lower seal portion includes a deformable portion.

In yet another embodiment of the valve, the valve seal member further comprises a valve poppet positioned between the upper seal portion and the lower seal portion.

In yet another embodiment of the valve, the valve seal member further comprises a valve poppet positioned between the upper seal portion and the lower seal portion, with the valve poppet including an actuator member receptacle that is adapted to receive at least a portion of a valve actuator member.

In yet another embodiment of the valve, the valve seal member further comprises a lip formed on the upper seal portion, a lip formed on the lower seal portion, and a retainer comprising an upper ring configured to retain the upper seal portion in the upper seal channel, with the upper ring including a step that receives the lip of the upper seal portion, a lower ring configured to retain the lower seal portion in the lower seal channel, with the lower ring including a step that receives the lip of the lower seal portion, and one or more joiners extending between the upper ring and the lower ring.

DESCRIPTION OF THE DRAWINGS

The same reference number represents the same element on all drawings. It should be understood that the drawings are not necessarily to scale.

DETAILED DESCRIPTION OF THE INVENTION

FIGS. 2-7 and the following description depict specific examples to teach those skilled in the art how to make and use the best mode of the invention. For the purpose of teaching inventive principles, some conventional aspects have been simplified or omitted. Those skilled in the art will appreciate variations from these examples that fall within the scope of the invention. Those skilled in the art will appreciate that the features described below can be combined in various ways to form multiple variations of the invention. As a result, the invention is not limited to the specific examples described below, but only by the claims and their equivalents.

Figure 2:
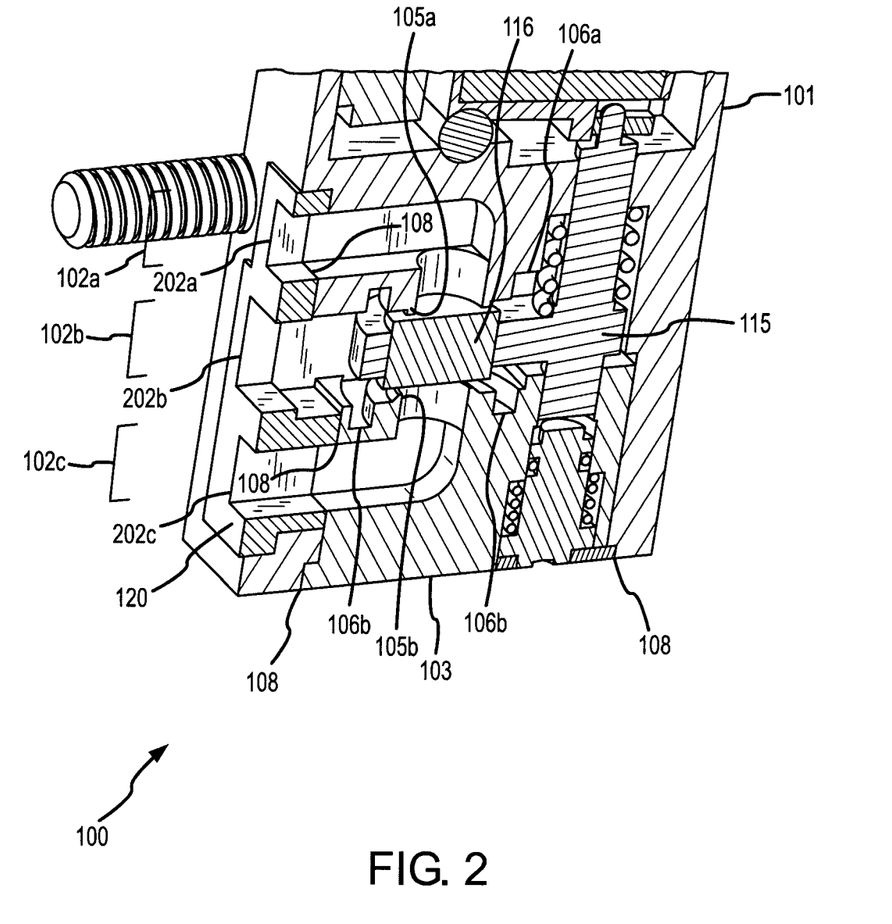
FIG. 2 shows a cross-sectional view of a valve according to an embodiment of the invention.

FIG. 2 shows a cross-sectional view of a valve 100 according to an embodiment of the invention. The valve includes a valve body 101, a valve seat insert 103, and a valve seal member 120. The valve seal member 120 includes one or more port apertures 202, such as the port apertures 202a-202c, shown. The valve seat insert 103 and the valve seal member 120 are both assembled to the valve body 101. The valve seal member 120 seals to both the valve body 101 and to the valve seat insert 103 at the sealing region 108. The one or more port apertures 202 substantially align with corresponding passages formed by the valve body 101 and the valve seat insert 103 in order to form one or more ports 102.

A fluid traveling into or out of a port encounters only one sealing region. There is no need for a ring seal for sealing the valve seat insert 103 into the valve body 101, as in the prior art.

The sealing region 108 at the interface between the valve seal member 120 and the valve body 101 or the valve seat insert 103 can be realized by compression of the valve seal member 120 to the other two components. The compression forces the at least partially compressible valve seal member 120 to deform and to seal against corresponding portions of the valve body 101 and of the valve seat insert 103.

Where the sealing region 108 comprises the interface between the valve body 101 and the valve seat insert 103, the sealing region 108 can include any manner of bonding agent or adhesive, welds, etc. Where the valve body 101 and the valve seat insert 103 comprise a plastic material, for example, the sealing region 108 can comprise ultrasonic or laser welds.

A valve poppet 116 is affixed to an actuator member 115. The actuator member 115 moves in the valve body 101 in order to bring the valve poppet 116 into contact with and away from at least one valve seat 105. The valve can include multiple valve seats 105. In the embodiment of the figure, the valve 100 includes an upper valve seat 105a and a lower valve seat 105b. The valve poppet 116 sealingly contacts the at least one valve seat 105. The contact can select or de-select the ports 102a and 102c.

Figure 3:
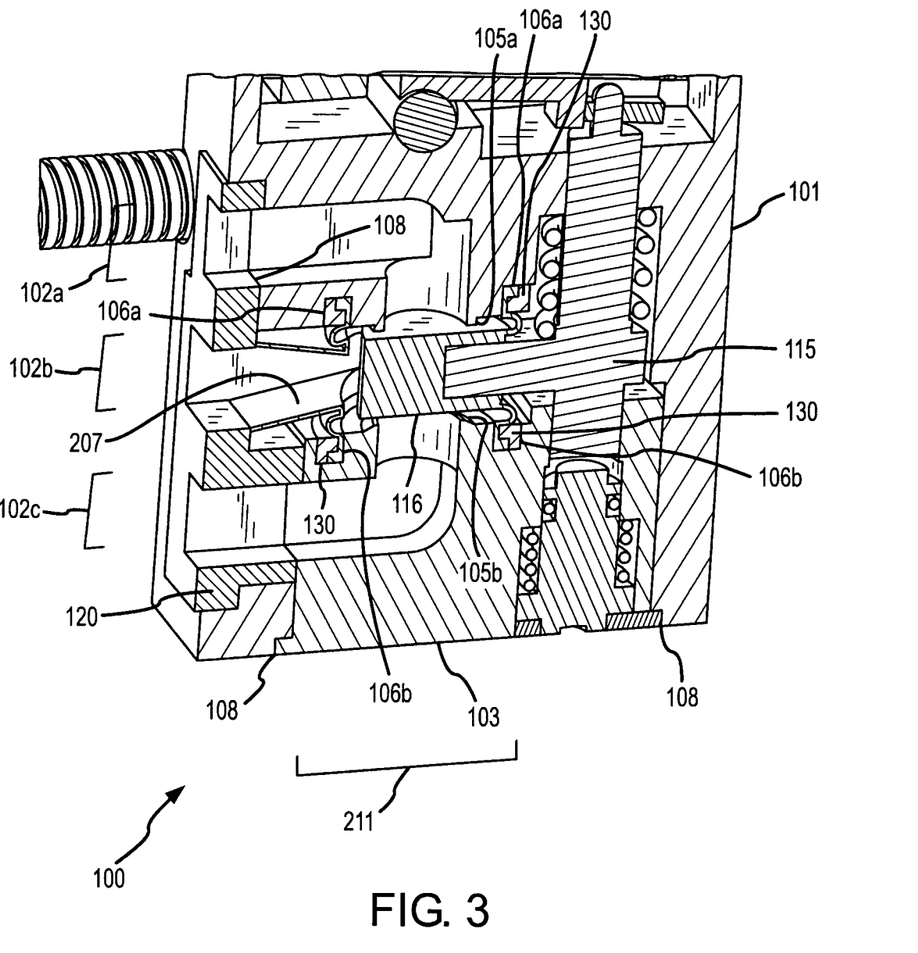
FIG. 3 shows a cross-sectional view of a valve according to an embodiment of the invention.

FIG. 3 shows a cross-sectional view of a valve 100 according to an embodiment of the invention. The valve includes a valve body 101, a valve seat insert 103, and the valve seal member 120 according to another embodiment of the invention. The valve seal member 120 in this embodiment further comprises a duct 207 and a seal portion 211 (also see FIGS. 4-5 and the accompanying discussion). The valve seat insert 103 and the valve seal member 120 are again both assembled to the valve body 101. However, in this embodiment, the seal portion 211 of the valve seal member 120 additionally seals to the valve body 101 at an upper seal channel 106a and the valve seal member 120 seals to the valve seat insert 103 at a lower seal channel 106b. A fluid traveling into or out of a port encounters only two sealing regions: the sealing region 108 and a seal formed between the seal portion 211 and either the valve body 101 (upper) or the valve seat insert 103 (lower). There is no need for a ring seal for sealing the valve seat insert 103 into the valve body 101, as in the prior art.

It can be seen from the figures that the actuator member 115 and associated springs, etc., are sealed off from the valve poppet 116. As a result, the valve 100 can be efficiently and thoroughly drained, cleaned, sanitized, etc. The valve 100 therefore comprises a media isolated valve. Consequently, the valve 100 can be used for various medical, analytical, chemical, and food preparation purposes.

Figure 4:
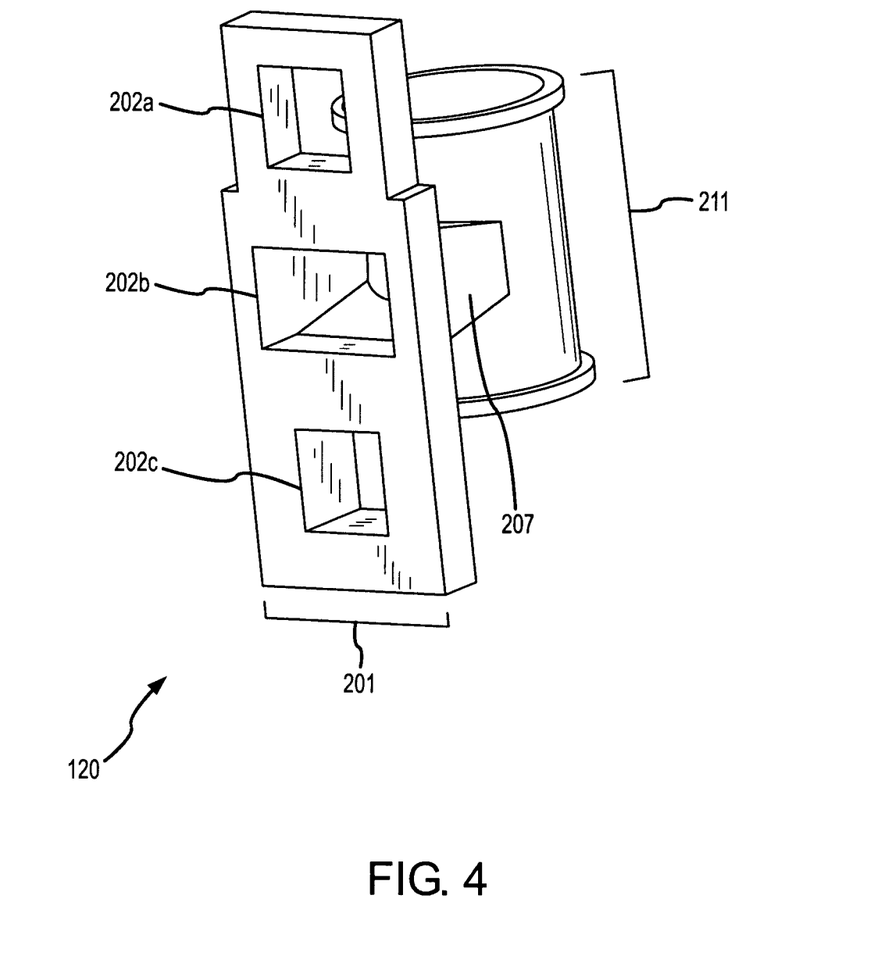
FIG. 4 shows a valve seal member according to an embodiment of the invention.

FIG. 4 shows the valve seal member 120 according to an embodiment of the invention. The valve seal member 120 includes a port interface portion 201 including port apertures 202a, 202b, and 202c that correspond to the ports 102a, 102b, and 102c. The valve seal member 120 further includes the seal portion 211 (discussed below in conjunction with FIG. 5).

The valve seal member 120 further includes the duct 207 that communicates between the seal portion 211 and the port 202b of the port interface portion 201.

Figure 5:
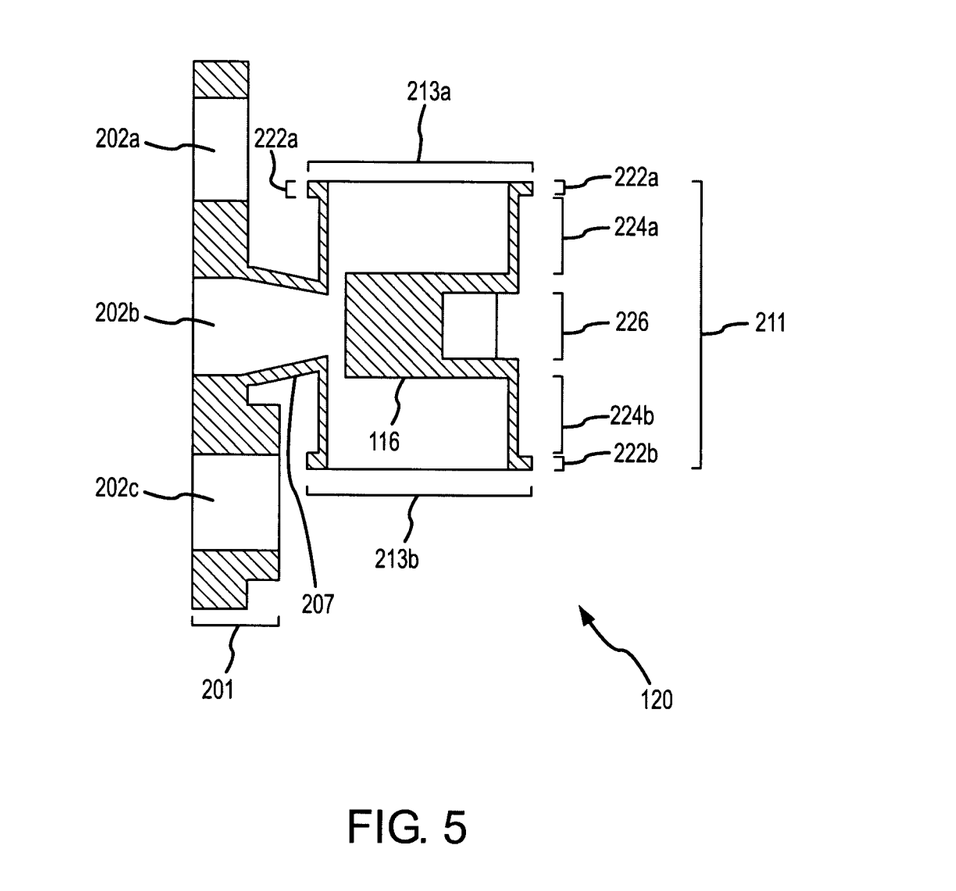
FIG. 5 is a cross-sectional view of the valve seal member embodiment of FIG. 3 according to the invention.

FIG. 5 is a cross-sectional view of the seal member 120 embodiment of FIG. 4 according to the invention. This figure shows detail of the seal portion 211. The seal portion 211 is connected to the port 202b by the duct 207, as previously discussed. The seal portion 211 includes an upper seal portion 213a and a lower seal portion 213b. The upper seal portion 213a and the lower seal portion 213b in one embodiment encompass an upper valve seat 105a and encompass a lower valve seat 105b, respectively (see FIG. 3).

The seal portion 211 further includes a valve poppet 116 having an actuator member receptacle 226. A portion of the actuator member 115 fits into the actuator member receptacle 226, wherein upward and downward movement of the actuator member 115 moves the valve poppet 116 upwards and downwards.

The seal portion 211 includes deformable portions 224a and 224b and lips 222a and 222b. The deformable portions 224a and 224b can deform according to movement of a valve mechanism, such as the valve poppet 116. When compressed, a deformable portion 224 can bulge outward to accommodate movement of the valve poppet 116. The lips 222a and 222b can be employed to retain the upper and lower ends of the seal portion 211 to the corresponding valve body 101 and valve seat insert 103 (see FIG. 3).

The seal member 120 can be formed of a flexible or at least partially flexible material. The seal member 120 can be formed of an elastic or at least partially elastic material. Therefore, when a deformable portion 224 is compressed, it may exert at least a modest force against the compressive force, therefore aiding in movement of the valve poppet 116 in an opposite direction.

Figure 6:
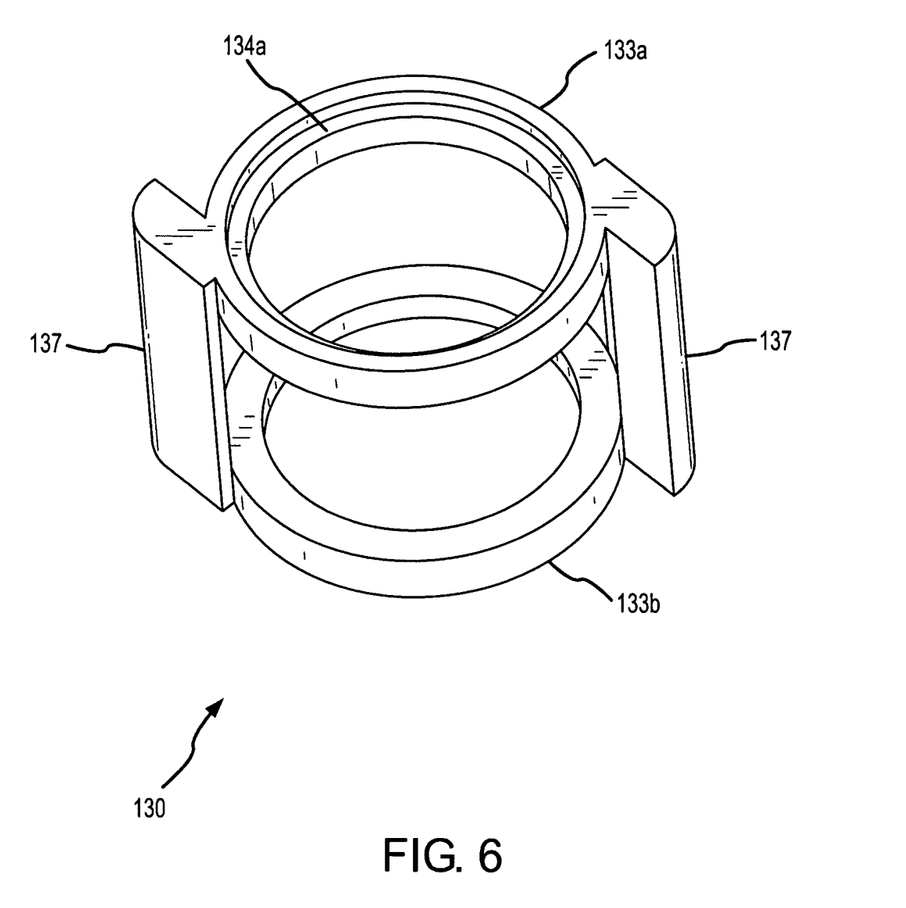
FIG. 6 shows a retainer according to an embodiment of the invention.

FIG. 6 shows the retainer 130 according to an embodiment of the invention. The retainer 130 includes an upper ring 133a and a lower ring 133b. The upper ring 133a and the lower ring 133b include a step 134a (shown) and a step 134b (not visible). The lips 222 of the seal member 120 fit into the steps 134a and 134b (see FIG. 3).

The retainer 130 further includes one or more joiners 137 that extend between the upper ring 133a and the lower ring 133b. The one or more joiners 137 space apart the upper and lower rings 133a and 133b. The one or more joiners 137 ensure that the upper and lower lips 222a and 222b are forced substantially into the upper seal channel 106a and the lower seal channel 106b. As a result, the upper and lower lips 222a and 222b are at least somewhat compressed in order to form a seal. The one or more joiners 137 further provide support and rigidity to the seal member 120.

In use, the upper ring 133a fits into an upper seal channel 106a in an upper valve interior surface while the lower ring 133b fits into a corresponding lower seal channel 106b in a lower valve interior surface. In one embodiment, the upper ring 133a fits into an upper seal channel 106a in the valve body 101 while the lower ring 133b fits into a corresponding lower seal channel 106b in the valve seat insert 103. Therefore, as a consequence, the retainer 130 holds the upper and lower ends of the seal portion 211 of the valve seal member 120 in the respective channels 106a and 106b. The retainer 130 can fit into the respective channels through a compressive or frictional fit, for example.

Figure 7:
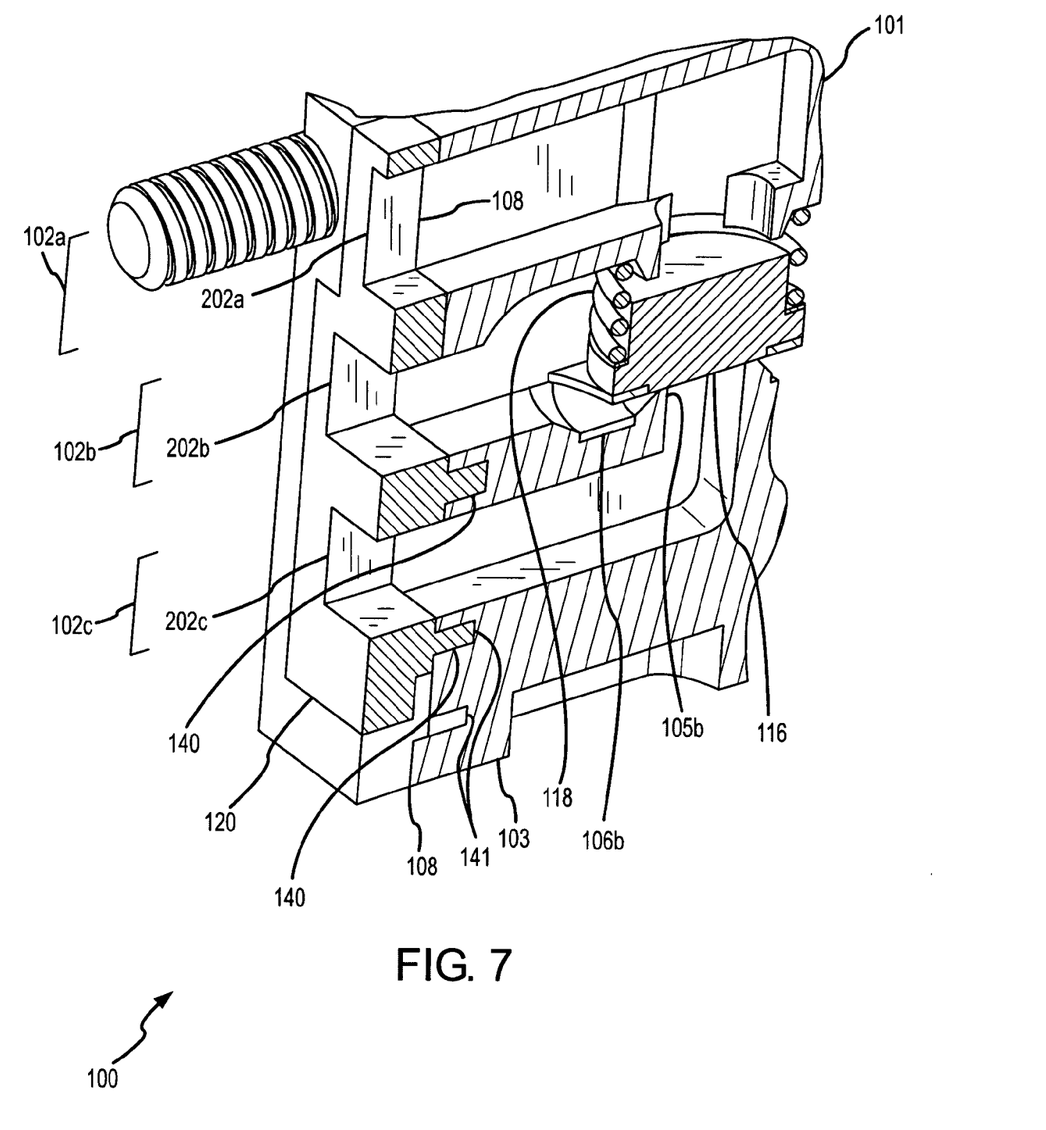
FIG. 7 shows a cross-sectional view of the valve according to an embodiment of the invention.

FIG. 7 shows a cross-sectional view of the valve 100 according to an embodiment of the invention. In this embodiment, the figure shows one or more tongue projections 140 that extend from the valve seal member 120. The one or more tongue projections 140 can fit to one or more corresponding depressions 141 in the valve seat insert 103. The one or more tongue projections 140 and depressions 141 can form an improved seal between the valve seal member 120 and the valve seat insert 103 by increasing a seal surface area. In addition, the one or more tongue projections 140 and depressions 141 can aid in aligning and retaining the valve seal member 120 to the valve seat insert 103. It should be understood that the tongue projections 140 and depressions 141 can also be applied to the valve seal member 120 of any of the other embodiments of the invention.

The valve seal member according to the invention can be employed according to any of the embodiments in order to provide several advantages, if desired. The invention provides a valve seal member that seals to a valve body. The invention provides a valve seal member that seals to a valve seat insert. The invention provides a valve seal member that seals more than one component of a valve. The invention provides a valve seal member that includes an integral valve poppet.

What is claimed is:

1. A valve seal member (120), comprising:
   a port interface portion (201) including one or more port apertures (202);
   a duct 207 connected to the port interface portion (201) and in fluid communication with a particular port aperture of the one or more port apertures (202);
   a seal portion (211) connected to the duct 207 and comprising:
      an upper seal portion (213a) adapted to encompass an upper valve seat (105a);
      a lower seal portion (213b) adapted to encompass a lower valve seat (105b);
      a lip (222a) formed on the upper seal portion (213a); and
      a lip (222b) formed on the lower seal portion (213b);
   wherein the duct (207) provides a continuous sealed passage from the particular port aperture of the port interface portion (201) to the upper seal portion (213a) and the lower seal portion (213b) of the seal portion (211);
   a retainer (130) adapted to hold the seal portion (211) in position, with the retainer (130) comprising:
      an upper ring (133a) adapted to retain the upper seal portion (213a) to an upper valve interior surface, with the upper ring (133a) including a step (134a) that receives the lip (222a) of the upper seal portion (213a);
      a lower ring (133b) adapted to retain the lower seal portion (213b) to a lower valve interior surface, with the lower ring (133b) including a step (134b) that receives the lip (222b) of the lower seal portion (213b); and
      one or more joiners (137) extending between the upper ring (133a) and the lower ring (133b).

2. The valve seal member (120) of claim 1, with the valve seal member (120) being formed of an at least partially flexible material.

3. The valve seal member (120) of claim 1, with the valve seal member (120) being formed of an at least partially elastic material.

4. The valve seal member (120) of claim 1, with the valve seal member (120) further comprising one or more tongue projections (140) that are configured to fit to one or more corresponding depressions (141) in the vale seat insert (103).

5. The valve seal member (120) of claim 1, with the upper seal portion (213a) including a deformable portion (224a) and with the lower seal portion (213b) including a deformable portion (224b).

6. The valve seal member (120) of claim. 1, with the valve seal member (120) further comprising a valve poppet (116) positioned between the upper seal portion (213*a*) and the lower seal portion (213*b*), 7. The valve seal member (120) of claim 1, with the valve seal member (120) further comprising a valve poppet (116) positioned between the upper seal portion (213*a*) and the lower seal portion (213*b*), with the valve poppet (116) including a actuator member receptacle (226) that is adapted to receive at least a portion of a valve actuator member (115).

* * * * *